United States Patent [19]
Silberger et al.

[11] Patent Number: 6,028,884
[45] Date of Patent: Feb. 22, 2000

[54] METHOD AND APPARATUS FOR MEASURING NONLINEAR EFFECTS IN A COMMUNICATION SYSTEM

[75] Inventors: Amnon Silberger; Brian Butler, both of La Jolla; Leonard N. Schiff, San Diego, all of Calif.

[73] Assignee: QUALCOMM Incorporated, San Diego, Calif.

[21] Appl. No.: 09/172,742

[22] Filed: Oct. 14, 1998

Related U.S. Application Data

[60] Provisional application No. 60/061,943, Oct. 14, 1997.

[51] Int. Cl.$^7$ .................................................. H04B 15/00
[52] U.S. Cl. ........................ 375/200; 375/206; 375/295; 370/320
[58] Field of Search .................................... 370/320, 318, 370/329, 332, 335, 341, 342, 252; 375/200, 206, 295, 260

[56] References Cited

U.S. PATENT DOCUMENTS

| | | | |
|---|---|---|---|
| 5,309,474 | 5/1994 | Gilhousen et al. ...................... | 375/200 |
| 5,691,974 | 11/1997 | Zehavi et al. ............................ | 370/203 |
| 5,731,993 | 3/1998 | Wachs et al. ............................ | 364/483 |
| 5,924,015 | 7/1999 | Garrison et al. ........................ | 455/13.4 |

FOREIGN PATENT DOCUMENTS

| | | | |
|---|---|---|---|
| 9619048 | 6/1996 | WIPO ............................ | H04B 7/005 |
| 9731428 | 8/1997 | WIPO ............................ | H04B 1/707 |

*Primary Examiner*—Michael Horabik
*Assistant Examiner*—Binyam Tadesse
*Attorney, Agent, or Firm*—Russell B. Miller; Gregory D. Ogrod

[57] ABSTRACT

A method and apparatus for accurately determining the operating characteristics or impact of nonlinear effects on devices or communication systems transferring orthogonally coded spread-spectrum communication signals. A Walsh Power Ratio, is used to more accurately determine system response. This information can be used by power control loops in controlling or adjusting the operation of nonlinear elements or stages such as high power amplifiers in orthogonal CDMA communication systems to provide improved system response. The information can also be employed in assigning channels to systems users, and to proceed with physical changes to system hardware. The measurements used to formulate the WPR can be made to individual components or to entire systems by injecting communication signals in multiple channels containing data, and leaving at least one empty channel. The received power per channel on the output side of the system or device is then measured. A ratio of power density for the empty to the active channels is then formed. The determination of WPR for a system or components can be realized during periods of operation through periodic transfer of test signals either at allocated times or by interleaving among existing traffic signals in the system.

24 Claims, 8 Drawing Sheets

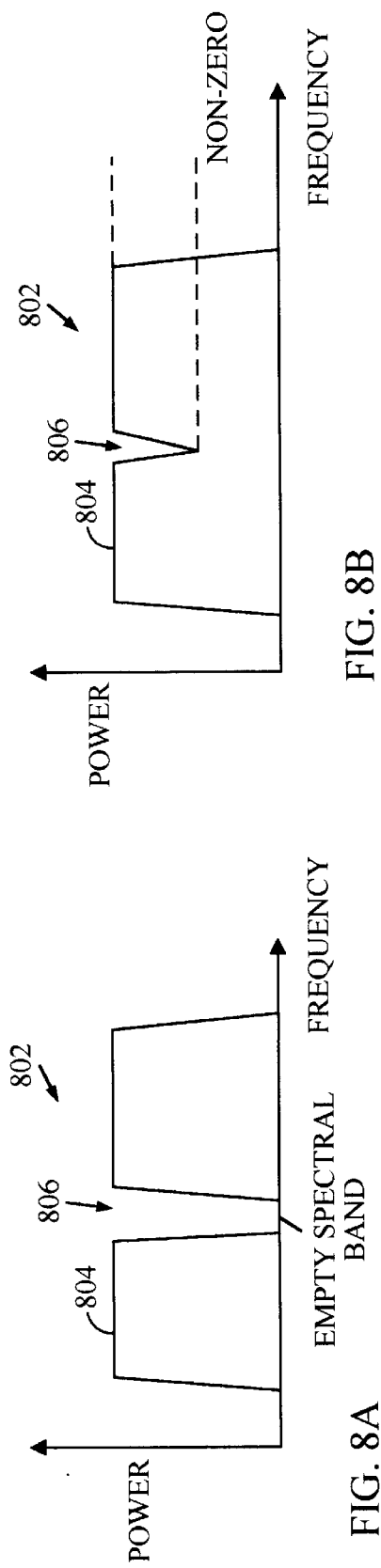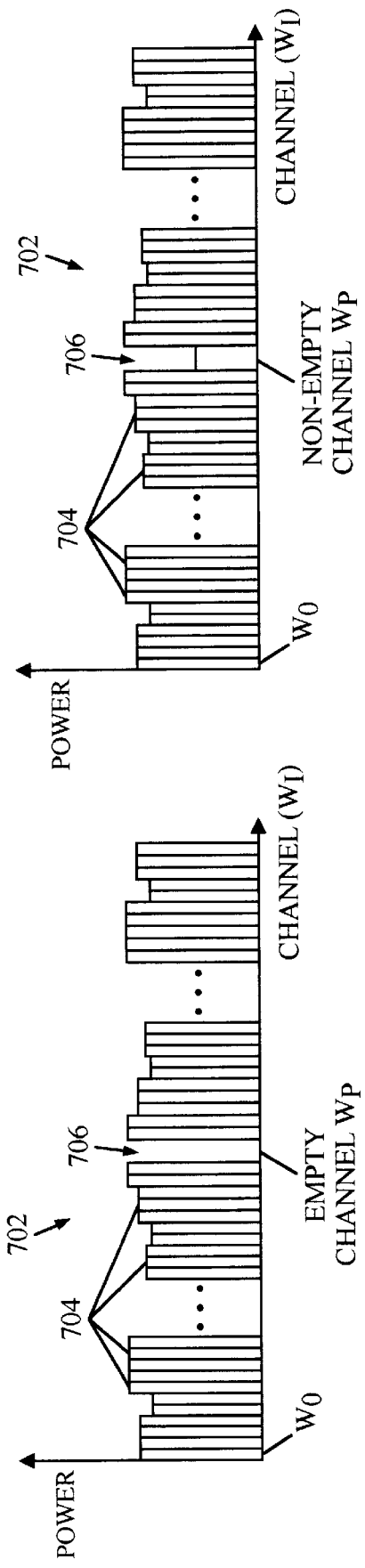

METHOD AND APPARATUS FOR MEASURING NONLINEAR EFFECTS IN A COMMUNICATION SYSTEM

This application claims benefit of provisional application Ser. No. 60/061,943 filed Oct. 14, 1997.

BACKGROUND OF THE INVENTION

I. Field of the Invention

The present invention relates to nonlinear devices and more particularly to a method for determining the affects of nonlinear device characteristics on the transfer of signals in a communications system. The invention further relates to a method of using the ratio of power in active versus inactive system channels in an orthogonal CDMA communication system, and more specifically using a Walsh Power Ratio to control the operation of nonlinear stages such as power amplifiers.

II. Related Art

One type of multiple access communication system used for transferring information among a large number of system users is based on code division multiple access (CDMA) spread spectrum techniques. Such communication systems are disclosed in the teachings of U.S. Pat. No. 4,901,307, which issued Feb. 13, 1990 under the title "Spread Spectrum Multiple Access Communication System Using Satellite Or Terrestrial Repeaters", and U.S. Pat. No. 5,691,974, which issued Nov. 25, 1997, under the title "Method And Apparatus For Using Full Spectrum Transmitted Power In A Spread Spectrum Communication System For Tracking Individual Recipient Phase Time And Energy," which are both assigned to the assignee of the present invention, and incorporated herein by reference.

These patents disclose communication systems in which generally mobile or remote system users or subscribers use transceivers to communicate with other system users or desired signal recipients, such as through a connected public telephone switching network. The transceivers communicate signals through gateways and satellites, or terrestrial base stations (also referred to as cell-sites or cells) using CDMA spread spectrum communication signals.

In a typical spread-spectrum communication system, one or more sets or pairs of preselected pseudorandom noise (PN) code sequences are used to modulate or 'spread' user information signals over a predetermined spectral band prior to modulation onto a carrier for transmission as communication signals. PN spreading is a method of spread-spectrum transmission that is well known in the art, and produces a communication signal with a bandwidth much greater than that of the underlying data signal. In the base station- or gateway-to-user communication link, also referred to as the forward link, PN spreading codes or binary sequences are used to discriminate between signals transmitted by different base stations or between signals of different beams, satellites, or gateways, as well as between multipath signals. In the user terminal-to-base-station or -gateway communication link, also referred to as the reverse link, PN spreading codes or binary sequences are used to discriminate between signals intended for different beams, satellites, or gateways, as well as between multipath signals.

These codes are typically shared by all communication signals within a given cell or beam, and time shifted or offset between adjacent beams or cells to create different spreading codes. The time offsets provide unique beam identifiers which are useful for beam-to-beam handoff and for determining signal timing relative to basic communication system timing.

In a typical CDMA spread-spectrum communication system, channelizing codes are used to discriminate between signals intended for different users within a cell or between user signals transmitted within a satellite beam, or sub-beam, on a forward link. That is, each user transceiver has its own orthogonal channel provided on the forward link by using a unique 'covering' or 'channelizing' orthogonal code. Walsh functions are generally used to implement the channelizing codes, with a typical length being on the order of 64 code chips for terrestrial systems and 128 code chips for satellite systems. In this arrangement, each Walsh function of 64 or 128 chips is typically referred to as a Walsh symbol. The derivation of Walsh codes is more fully disclosed in U.S. Pat. No. 5,103,459 entitled "System And Method For Generating Signal Waveforms In A CDMA Cellular Telephone System", which is assigned to the assignee of the present invention and incorporated herein by reference.

The gateways or base stations, and satellites used in the systems discussed above use high power amplifiers (HPAs) to increase the power of signals being transferred to and from the satellites, gateways, and user terminals in or serviced by the communication system. It is desirable to achieve a significant amount of power increase in the signals, but at the same time waste as little power as possible in so doing. That is, expend power to amplify a signal but no more than necessary to achieve a desirable communication link. This relates to the desire to conserve power and, therefore, energy resources needed to power the amplifiers; and to minimize signal power to decrease mutual signal interference and increase system capacity.

It is also important to recognize that in a satellite communication system, the amount of power available for signal transmission is limited by the power-generating capacity of the satellite. To optimize the use of this power, it must be allocated between traffic signals, those intended to transfer information to and from users, and pilot signals, those intended to act as phase and time references, carefully. If too little power is allocated to the pilot signal, the user terminals cannot accumulate sufficient energy to synchronize their receivers with a gateway or base station. Conversely, if too much pilot signal power is transmitted, the amount of power available for traffic signals, and, thus, the number of users that can be supported, is reduced.

Therefore, to maximize the user capacity that can be handled by a satellite, the amount of pilot signal power transmitted must be accurately controlled. In addition, there are other shared resources such as paging and synchronization signals used to transfer system information, which act as shared resources similar to pilot signals. Such signals also impact power consumption in satellite or other power-limited or power-controlled communication systems. It is also desirable to minimize the amount of energy present in these signals to decrease mutual interference, in order to increase system capacity.

Power amplifiers in communication systems that operate at high intermodulation levels, such as those discussed above, generally operate close to their saturation point. The saturation point is the point at which the output power of the amplifier is no longer increasing with increasing input power. That is, after the saturation point has been reached, the output power of the power amplifier is substantially constant regardless of the input. Thus, the power amplifier exhibits a nonlinearity in its operation near the saturation point. The saturation region is also referred to as the gain compression region.

Intermodulation is a term that is used to describe the nonlinearity. For example, when a nonlinear device operates on a signal having multiple spectral components to produce an output signal, the output signal is comprised of spectral components that were not present in the original input signal. Some of the components can be removed by filtering, and do not cause significant distortion. Other components, however, cannot be removed by filtering. The components that cannot be removed by filtering give rise to nonlinear distortion. These components are commonly referred to as intermodulation products.

This intermodulation causes undesirable distortion in most communication systems. For example, in a CMDA communication system a CDMA signal is amplified prior to transmission over a communication channel. A nonlinear power amplifier is commonly used to provide this amplification. CDMA signals transmitted in real communication systems often exhibit a non-constant envelope which can result from a plurality of CDMA signals being multiplexed together to form a single multiplexed CDMA signal. Such a signal can result from several CDMA signals being combined onto a single carrier to form a CDMA channel, or several CDMA channels at different frequencies being combined into a signal for transmission. In any case, the multiplexed CDMA signal exhibits a non-constant envelope. Other well known causes can also give rise to the non-constant envelope phenomenon. As a result, the input power to the nonlinear amplifier traverses the input power range of the amplifier. Because, the nonlinear amplifier is nonlinear across its input range, the output signal exhibits undesirable nonlinear effects, such as intermodulation products.

Nonlinear distortion, such as that caused by intermodulation, is an undesirable effect which can destroy the information content of a signal in a communication system. Unfortunately, nonlinear distortion can also affect CDMA communication signal waveforms, such as those following the IS-95 standard, in such a manner that the channels no longer remain orthogonal. In essence, the non-linear response causes the coded channels to "leak" or "bleed" into each other.

Traditionally, the performance of power amplifiers and other non-linear elements used to generate and amplify communication signals is quantified with two-tone, multi-tone, and noise loaded tests. In particular, the noise loaded test is referred to as the Noise Power Ratio, so called NPR, test, and measures how much energy density leaks into a narrow notch or the noise injected into the non-linear device under test.

However, there are some key differences between the intermodulation performance of noise and direct sequence spread spectrum signals (DS-SS). In particular, when the spread spectrum data modulation is what is referred to as one-dimensional, for example BPSK type, the envelope statistics of the DS-SS waveform are different than noise. Even where many information signals are multiplexed together such as found in CDMA communication systems (for CDM or CDMA) the DS-SS waveform has significantly different envelope statistics than band-pass noise if these signals share the same carrier frequency and carrier phase.

Band-pass noise has a power probability density function (PDF) that is chi-square with two degrees of freedom. Forward link CDMA channels or signals having many users or user signals (traffic channels) have an approximate power PDF of chi-square with one degree of freedom. Forward link CDMA type signals that conform to the IS-95 standard are a special case of this, where the CDM or CDMA signals are kept orthogonal with Walsh codes. This form of coding might be referred to as orthogonal CDMA, or O-CDMA for short, but, this is still BPSK modulation. Significant amounts of intermodulations on an IS-95 waveform mean that the channels are no longer orthogonal, they "leak" or "bleed" into each other.

The result of this leaking is that simple noise measurements on a channel do not reflect a true response or measure of communication system performance in a CDMA environment. This means that a Noise Power Ratio (NPR) test cannot simply be used to measure or determine the effects of power adjustments or the appropriate level of power to use with a particular amplification stage in a spread spectrum system. This is true because noise in the system tends to shift energy into other otherwise orthogonal channels.

Another issue where noise performance does not necessarily reflect CDMA performance is in separating what are referred to as the AM/AM and AM/PM effects. Both of these are well known to affect traditional noise measurement techniques such as NPR. However coherent BPSK demodulation is much more sensitive to AM/AM than AM/PM. To illustrate this point, the output power and phase characteristics of a conventional nonlinear power amplifier are illustrated in FIG. 1. In FIG. 1, a curve 102 illustrates the phase of the output versus the phase of an input sine wave. Such a curve is commonly referred to as an "AM-PM" plot. A curve 104 illustrates the magnitude of the output power versus the input power for a sinusoidal input. Such a curve is commonly referred to as an "AM-AM" plot. Curve 102 illustrates that the phase of the output power versus input power is non-constant over most of the operating region of a conventional nonlinear power amplifier. Similarly, curve 104 illustrates that the magnitude of the power output is nonlinear near a saturation region 106. In the case of the power amplifier illustrated in FIG. 1, saturation region 106 starts at about −4 dBm. It would be apparent to any person skilled in the art that the saturation region can extend over a different range of values.

Another issue besides simply testing the response or otherwise characterizing a communication system element such as a power amplifier, is the selection of power levels during operation. In this situation, it would be convenient to have a more accurate measure of performance that could be used once a system is deployed or in use, to at least occasionally characterize its operation and make adjustments to the operation of nonlinear devices.

SUMMARY

Therefore, in view of the above stated, and other, problems encountered in the art, it is one purpose of the invention to provide a new technique for more accurately characterizing the impact of nonlinear devices on signal processing in a spread spectrum communication system. For example, the new technique can correctly determine the affects or correlation of power level versus decrease in orthogonality in power amplifiers.

These and other purposes, advantages, and objects are realized in a new method of testing or characterizing the response of devices, such as power amplifiers or other components used to manufacture a spread spectrum communication system, or entire communication systems. The new approach transfers signals into an input for a device or system under test, which are appropriately channelized by using a series or set of preselected orthogonal codes. That is, an input communication signal is generated having a series of separate "traffic" channel signals, each representing information or data signals covered or channelized by an individual orthogonal code. In one embodiment, Walsh functions are preferably used as the orthogonal codes.

Each of the channels is provided with some type of data or information to be transferred, except for one or more preselected channels. The number of empty channels is based on a degree of orthogonality to be measured. The data can be randomly generated or selected from a variety of known test signals or samples. Preferably, the active channels use the same overall input power level or gains, and the data rates and general content are reasonably similar. The resulting channel signals are combined or multiplexed into a CDMA communication signal that is transferred through the device or system to be tested and the energy measured according to channel. In one aspect of the invention, this is done by determining what data symbols were transmitted using correlation elements or devices, and measuring a sum of energies for each of the received symbols using accumulators and squaring elements, except for empty channels where energy is accumulated. The measured values are used to determine the amount of power per channel and in the signal overall.

A ratio is formed between the sum of energy detected across all "non-empty" or active channels and the desired "empty" or inactive channel. More properly, a ratio is formed from the energy in the empty channel and the average energy in the non-empty channels, to more properly account for the number of channels being used. This ratio provides an idea as to what percentage of energy has shifted into the empty channel, and the approximate impact of gain on the code purity of the output, and a measure of the degree to which orthogonality is degraded by the nonlinear response of the device under test. The sum of energies are divided by the number of channels used to generate an energy density which is then used to form the desired ratio.

The inventive method can be realized using apparatus constructed as dedicated test equipment which contains a transmit section and a receive section to test a non-linear device for its performance in a CDMA signal environment. A power amplifier or similar device to be tested is connected in a typical fashion to other circuitry with which it would normally operate.

In other embodiments, a test CDMA communication signal is injected or applied to a transmission section, circuitry, or elements within base stations or gateways having many channels of data. That is, data intended for transfer over multiple separate channels created by using the orthogonal codes, and one or more channels without data (empty). At least one receiver receives and demodulates this communication signal and estimates the power in each channel. These power measurements are then used to form the Walsh Power Ratio (WPR) of energy density in empty channels versus full or active channels.

In further aspects of the invention, this technique can be used to test portions of a communication system itself when operational. That is, appropriate test signals can be transferred during maintenance periods or periods of non-use, to perform the measurements and characterize the current response of the system. Alternatively, fixed pattern (and blank) signals can be transferred through the system interleaved with typical traffic channel signals to test the system at periodic intervals, or other times as desired. This allows obtaining information on system response in real time and adjusting the operation of power amplifiers on satellites, or other devices to provide improved system operation and capacity.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein:

FIGS. 7a and 7b illustrate representative input and output waveforms in a WPR measurement scheme.

FIGS. 8a and 8b illustrate representative input and output waveforms in a corresponding NPR measurement scheme.

DETAILED DESCRIPTION OF PREFERRED EMBODIMENTS

I. Introduction

The present invention is a method and apparatus for more accurately determining operating characteristics of nonlinear signal processing elements used in a spread-spectrum communications system. More specifically, the present invention uses a Walsh Power Ratio to more accurately characterize the impact of nonlinear effects on system or component performance, to allow improved control over the operation of nonlinear stages such as high power amplifiers in an orthogonal CDMA communication system.

The present invention is particularly suited for use with high power amplifiers used in CDMA satellite communications systems. However, as would be apparent to one skilled in the relevant art, the present invention can also be applied to other types of communications systems where devices or components operating with nonlinear characteristics are employed. Before discussing the embodiments of the present invention, a typical environment in which the invention can operate is presented.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems.

II. Exemplary Operating Environment

Figure 2:
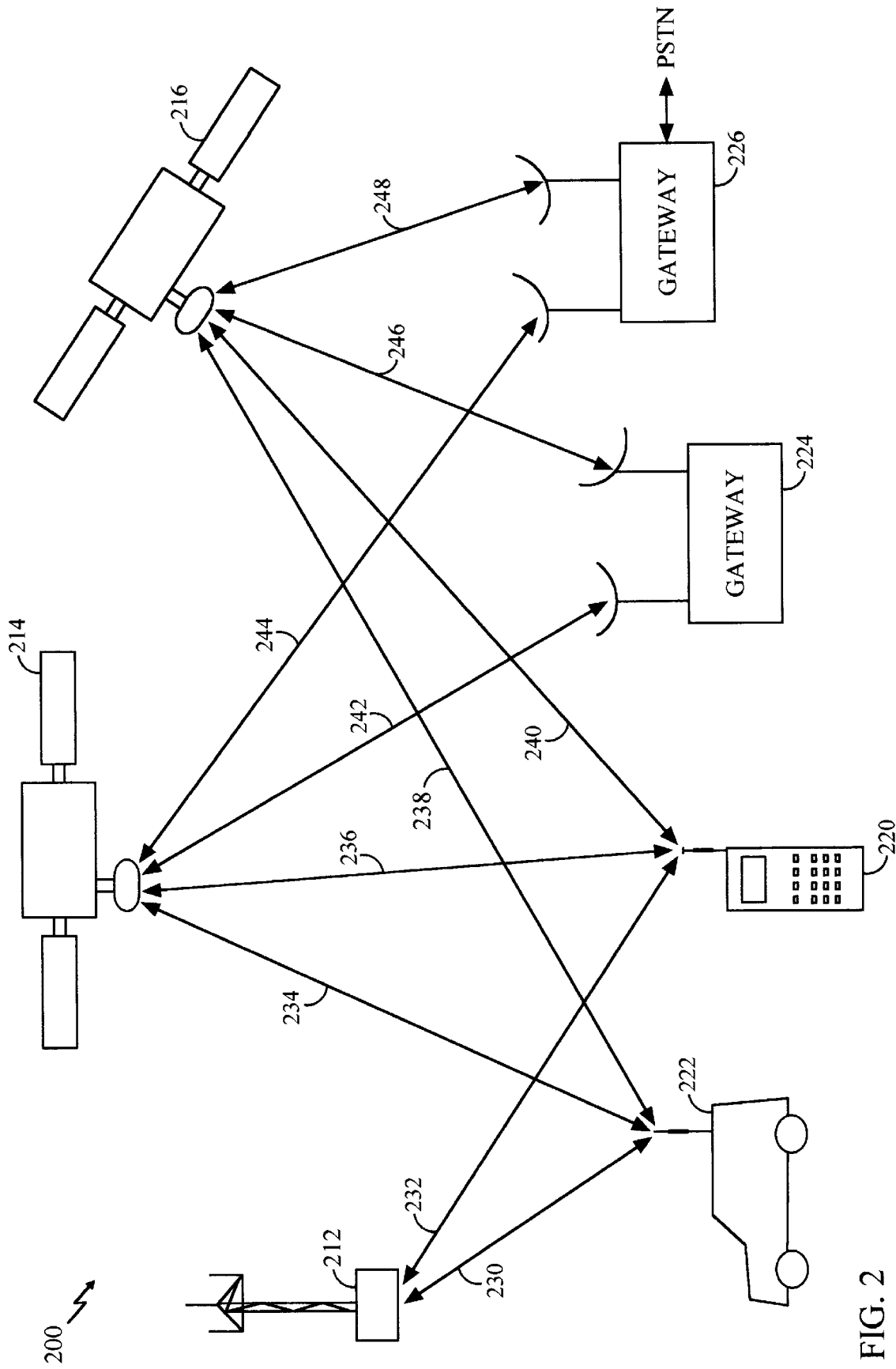
FIG. 2 illustrates a schematic overview of an exemplary wireless communication system.

An exemplary wireless communication system, such as a wireless telephone system, in which the present invention is found useful is illustrated in FIG. 2. Communication system 200 illustrated in FIG. 2 uses code division multiple access (CDMA) spread spectrum type communication signals with orthogonal coding, in communicating between communication system remote or mobile terminals and system gateways or base stations. In the portion of the communication system illustrated in FIG. 2, one base station 212 and two satellites 214 and 216, and two associated gateways or hubs 224 and 226 are shown for effecting communications with two mobile stations or user terminals 220 and 222. Typically, the base stations and satellites/gateways are components of separate communication systems, referred to as being terrestrial- and satellite-based, although this is not necessary. The total number of base stations, gateways, and satellites in such systems depends on desired system capacity and other factors well understood in the art. Gateways 224 and 226, and base station 212, may be used as part of one or two-way communication systems or simply to transfer messages or data to user terminals 220 and 222.

Mobile stations or user terminals 220 and 222 each have or comprise a wireless communication device such as, but not limited to, a cellular telephone, a data transceiver or transfer device (e.g., computers, personal data assistants, facsimile), or a paging or position determination receiver. Typically, such units are either hand-held or vehicle mounted as desired, but fixed units or other types of terminals can also be used where remote wireless service is desired. This latter type of service is particularly suited to using satellite repeaters to establish communication links in many remote areas of the world.

It is contemplated for this example that satellites 214 and 216 provide multiple beams directed to cover separate generally non-overlapping geographic regions. Generally, multiple beams at different frequencies, also referred to as CDMA channels or 'sub-beams' or FDMA signals, can be directed to overlap the same region. However, it is readily understood that the beam coverage or service areas for different satellites or base stations may overlap completely or partially in a given region depending on the communication system design, type of service being offered, and space diversity to be achieved. For example, each may provide service to different sets of users with different features at different frequencies, or a given mobile unit may use multiple frequencies and/or multiple service providers, each with overlapping geophysical coverage.

Figure 1:
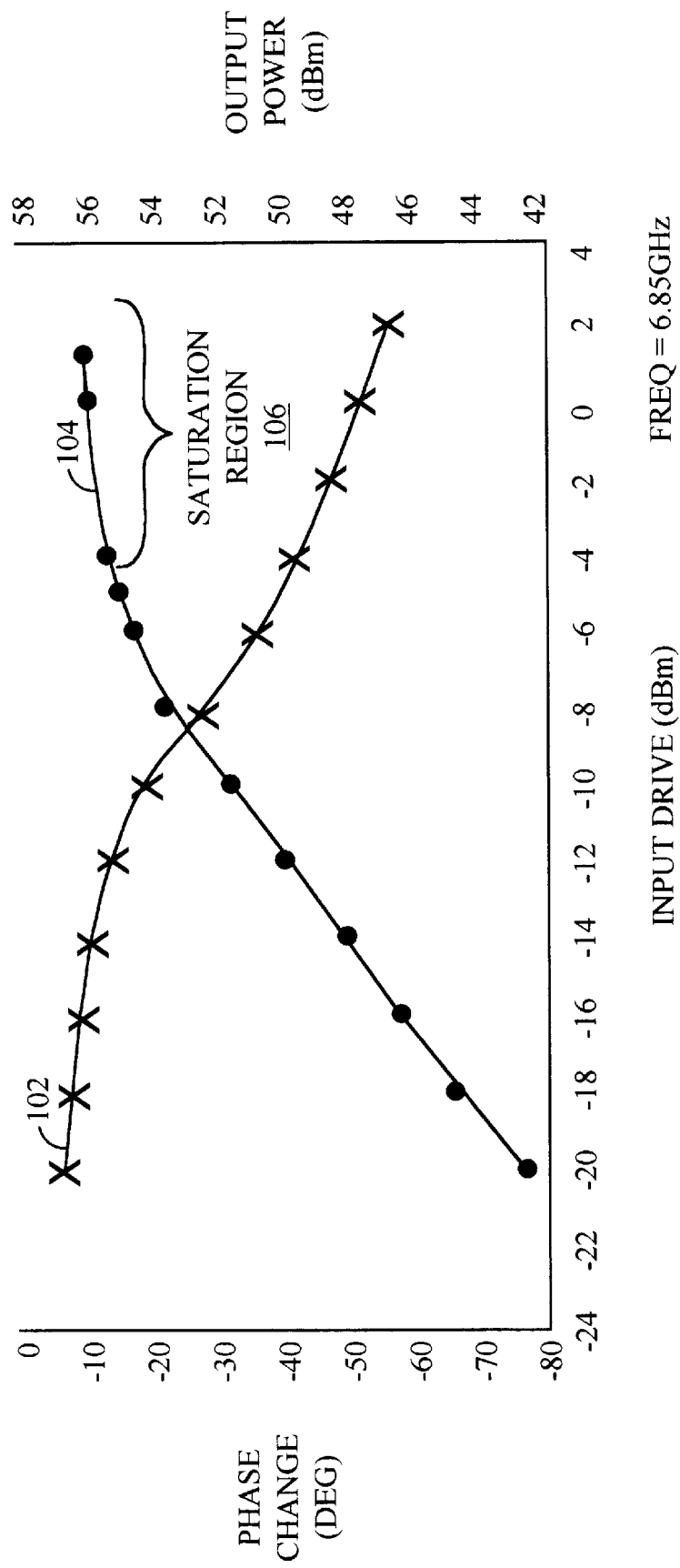
FIG. 1 illustrates the response of a conventional nonlinear amplifier versus output power.

In FIG. 1, some possible signal paths are illustrated for communications being established between user terminals 220 and 222 and base station 212 or through satellites 214 and 216 to one or more gateways or centralized hubs 224 and 226. The base station-user portions of communication links between base station 212 and user terminals 220 and 222 are illustrated by lines 230 and 232, respectively. The satellite-user portions of communication links between gateways 224 and 226 and user terminals 220 and 222 through satellite 214 are illustrated by lines 234 and 236, respectively. The satellite-user portions of communication links between gateways 224 and 226 and user terminals 220 and 222 through satellite 216 are illustrated by lines 238 and 240, respectively. The gateway-satellite portions of these communication links are illustrated by a series of lines 242, 244, 246, and 248. The arrowheads on these lines illustrate exemplary signal directions for each communication link, as being either a forward or a reverse link, and are present only for purposes of clarity and not as indicating any actual signal patterns or physical restrictions.

The communication system generally employs multiple satellites 214 and 216 traversing different orbital planes, and a variety of Low Earth Orbit (LEO) and other multi-satellite communication systems have been proposed for servicing a large number of user terminals. Those skilled in the art will readily understand how the teachings of the present invention are applicable to a variety of satellite and terrestrial communication systems.

The terms base station and gateway are sometimes used interchangeably in the art, with gateways being perceived as specialized base stations that direct communications through satellites, while base stations use terrestrial antennas to direct communications within a surrounding geographical region. User terminals are also sometimes referred to as subscriber units, mobile units, mobile stations, or simply "users," "mobiles," or "subscribers" in some communication systems, depending on preference.

As discussed above, each base station or gateway transmits a 'pilot' signal throughout a region of coverage. For satellite systems, this signal is transferred within each satellite 'beam' and originates with gateways being serviced by the satellite. A single pilot is typically transmitted by each gateway or base station for each satellite-to-user beam frequency. This pilot is shared by all users receiving signals over that beam. This technique allows many traffic channels or user signal carriers to share a common pilot signal for carrier phase reference.

Pilot signals use the same PN spreading code pair or set of codes throughout the communication system but with different relative code timing offsets for each beam, cell, or sector. Alternatively, different PN spreading codes (generator polynomials) are used between some base stations. In satellite communications systems, different sets of PN codes can be assigned for use within each orbital plane. This provides signal isolation or reduces interference and allows beams to be readily distinguished from each other. Each communication system design specifies the distribution of PN spreading codes and timing offsets within the system according to factors understood in the art.

Figure 3:
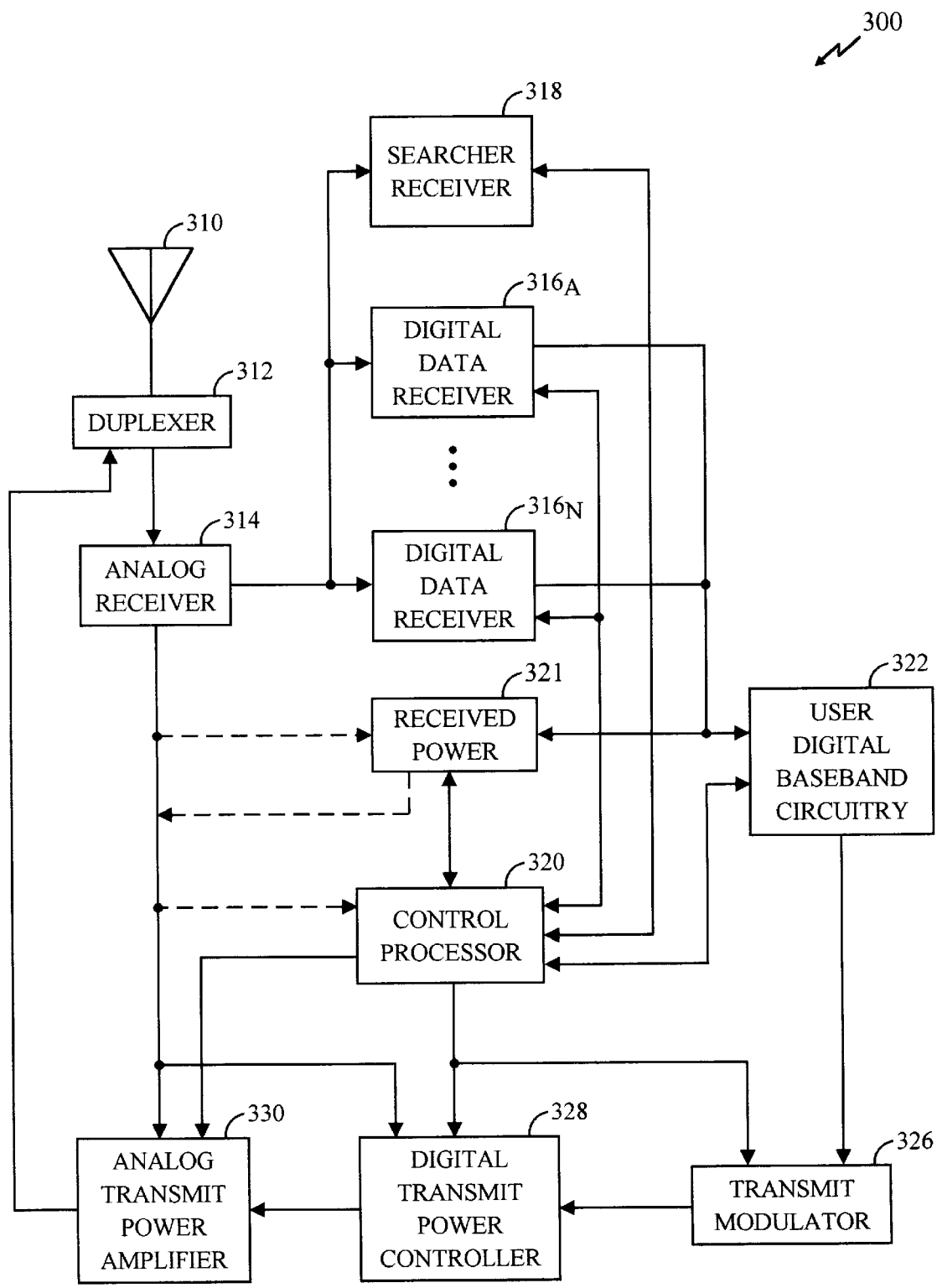
FIG. 3 illustrates a block diagram of a transmission stage for a gateway.

An exemplary design for a transmission section or portion of base station or gateway apparatus used to implement a CDMA communication system is illustrated in FIG. 3. In a typical gateway, several such transmission sections or systems are utilized to provide service to many user terminals at a time, and for several satellites and beams at any time. The number of transmission sections used by the gateway is determined by factors well known in the art, including system complexity, number of satellites in view, subscriber capacity, degree of diversity chosen, and so forth. Each communication system design also specifies the number of antennas available for the transmission sections to use in transferring signals.

An exemplary transceiver 300 for use in user terminals 220 and 222 is illustrated in FIG. 3. Transceiver 300 uses at least one antenna 310 for receiving communication signals which are transferred to an analog receiver 314, where they are downconverted, amplified, and digitized. A duplexer element 312 is typically used to allow the same antenna to serve both transmit and receive functions. Digital communication signals output by analog receiver 314 are transferred to at least one digital data receiver $316_A$ and at least one searcher receiver 318. Additional digital data receivers $316_B$–$316_N$ can be used to obtain desired levels of signal diversity, depending on the acceptable level of unit complexity, as would be apparent to one skilled in the relevant art.

At least one control processor 320 is coupled to digital data receivers 316A–316N along with the searcher receiver 318. Control processor 320 provides, among other functions, basic signal processing, timing, power and handoff control or coordination. Another basic control function often performed by control processor 320 is the selection or manipulation of PN code sequences or orthogonal functions to be used for processing communication signal waveforms. Control processor 320 signal processing can include determination of relative signal strength and computation of various related signal parameters. In some embodiments, the computation of signal strength may include the use of additional or separate circuitry such as received power element 321 to provide increased efficiency or speed in measurements or improved allocation of control processing resources.

Outputs for digital data receivers $316_A$–$316_N$ are coupled to digital baseband circuitry 322 within the user terminal. User digital baseband circuitry 322 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the user baseband circuitry using elements well known in the art. If diversity signal processing is employed, user digital baseband circuitry 322 can comprise a diversity combiner and decoder. Some of these elements may also operate under the control of, or in communication with, control processor 320.

When voice or other data is prepared as an output message or communications signal originating with the user terminal, user digital baseband circuitry 322 is used to receive, store, process, and otherwise prepare the desired data for transmission. User digital baseband circuitry 322 provides this data to a transmit modulator 326 operating under the control of control processor 320. The output of transmit modulator 326 is transferred to a digital transmit power controller 328 which provides output power control to an analog transmit power amplifier 330 for final transmission of the output signal from antenna 310 to a gateway. Information on the measured signal strength for received communication signals or one or more shared resource signals can be sent to the gateway using a variety of techniques known in the art. For example, the information can be transferred as a data signal or be appended to other messages prepared by user digital baseband circuitry 322. Alternatively, the information can be inserted as predetermined control bits by transmit modulator 326 or transmit power controller 328 under control of control processor 320.

Analog receiver 314 can provide an output indicating the power or energy in received signals. Alternatively, received power element 321 can determine this value by sampling an output of analog receiver 314 and performing processing well known in the art. This information can be used directly by transmit power amplifier 330 or transmit power controller 328 to adjust the power of user terminal transmitted signals. This information can also be used by control processor 320.

Digital receivers $316_A$–$316_N$ and searcher receiver 318 are configured with signal correlation elements to demodulate and track specific signals. Searcher receiver 318 is used to search for pilot signals, while digital receivers 316A–N are used to demodulate other signals (traffic) associated with detected pilot signals. Therefore, the outputs of these units can be monitored to determine the energy in the pilot signal or other shared resource signals. Here, this is accomplished using either received power element 321 or control processor 320.

Figure 4:
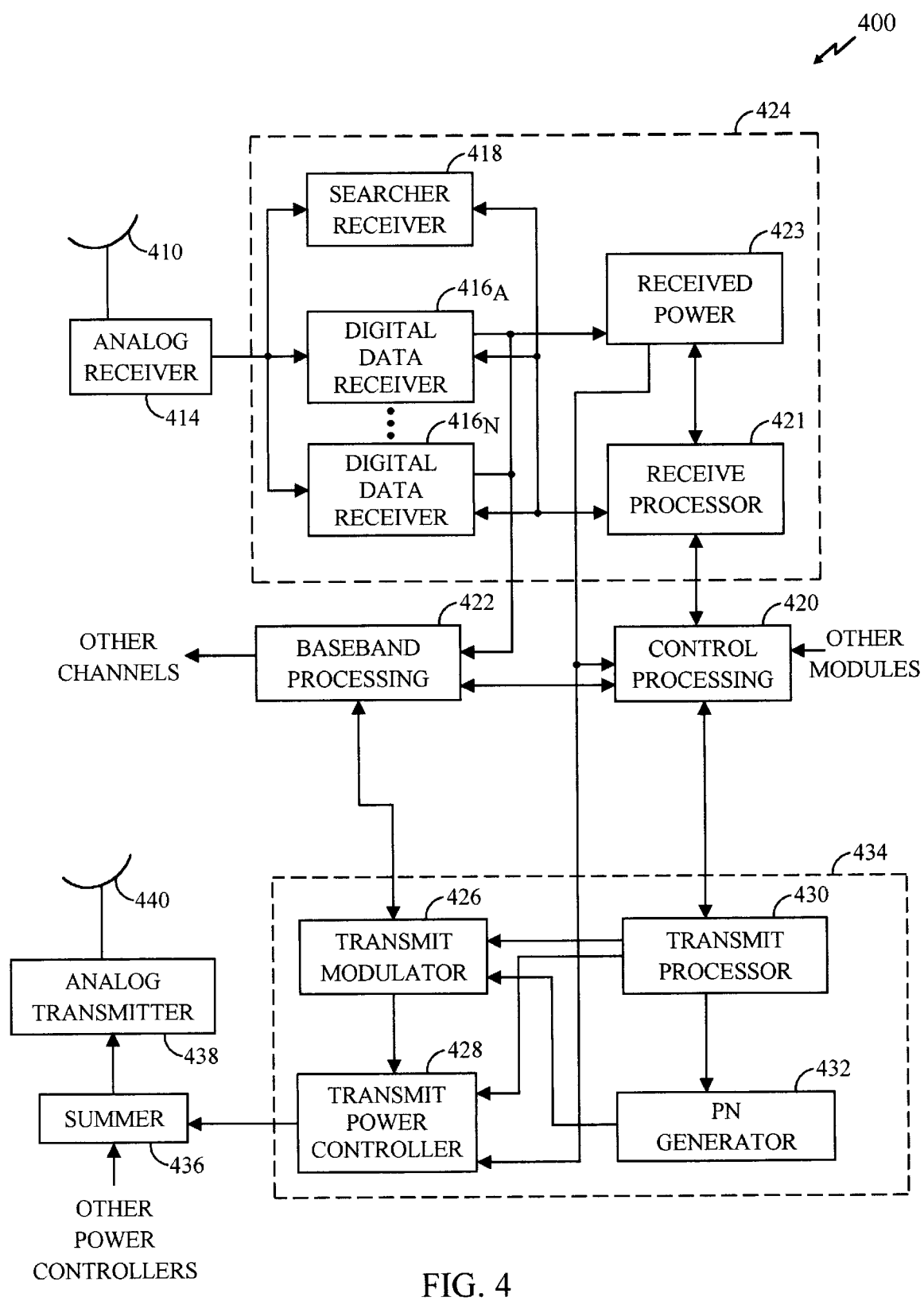
FIG. 4 illustrates a block diagram of a user terminal.

An exemplary transmission and reception apparatus 400 for use in gateways 224 and 226 is illustrated in FIG. 4. The portion of gateway 224 illustrated in FIG. 4 has one or more analog receivers 414 connected to an antenna 410 for receiving communication signals which are then downconverted, amplified, and digitized using various schemes well known in the art. Multiple antennas 410 are used in some communication systems. Digitized signals output by analog receiver 414 are provided as inputs to at least one digital receiver module, indicated by dashed lines generally at 424.

Each digital receiver module 424 corresponds to signal processing elements used to manage communications between one user terminal 222 and a gateway 224, although certain variations are known in the art. One analog receiver 414 can provide inputs for many digital receiver modules 424, and a number of such modules are typically used in gateways 224 and 226 to accommodate all of the satellite beams and possible diversity mode signals being handled at any given time. Each digital receiver module 424 has one or more digital data receivers 416 and a searcher receiver 418. Searcher receiver 418 generally searches for appropriate diversity modes of signals other than pilot signals. Where implemented in the communication system, multiple digital data receivers $416_A$–$416_N$ are used for diversity signal reception.

The outputs of digital data receivers 416 are provided to subsequent baseband processing elements 422 comprising apparatus well known in the art and not illustrated in further detail here. Exemplary baseband apparatus includes diversity combiners and decoders to combine multipath signals into one output for each user. Exemplary baseband apparatus also includes interface circuits for providing output data, typically to a digital switch or network. A variety of other known elements such as, but not limited to, vocoders, data modems, and digital data switching and storage components may form a part of baseband processing elements 422. These elements operate to control or direct the transfer of data signals to one or more transmit modules 434.

Signals to be transmitted to user terminals are each coupled to one or more appropriate transmit modules 434. A typical gateway uses a number of such transmit modules 434 to provide service to many user terminals 222 at a time, and for several satellites and beams at a time. The number of transmission modules 434 used by gateway 224 is determined by factors well known in the art, including system complexity, number of satellites in view, user capacity, degree of diversity chosen, and the like.

Each transmit module 434 includes a transmit modulator 426 which spread-spectrum modulates data for transmission. Transmit modulator 426 has an output coupled to a digital transmit power controller 428, which controls the transmission power used for the outgoing digital signal. Digital transmit power controller 428 applies a minimum level of power for purposes of interference reduction and resource allocation, but applies appropriate levels of power when needed to compensate for attenuation in the transmission path and other path transfer characteristics. A PN generator 432 is used by transmit modulator 426 in spreading the signals. This code generation can also form a functional part of one or more control processors or storage elements used in gateway 224 or 226.

The output of transmit power controller 428 is transferred to a summer 436 where it is summed with the outputs from other transmit power control circuits. Those outputs are signals for transmission to other user terminals 220 and 222 at the same frequency and within the same beam as the output of transmit power controller 428. The output of summer 436 is provided to an analog transmitter 438 for digital-to-analog conversion, conversion to the appropriate RF carrier frequency, further amplification and output to one or more antennas 430 for radiating to user terminals 220 and 222. Antennas 410 and 430 may be the same antennas depending on the complexity and configuration of the system.

At least one gateway control processor 420 is coupled to receiver modules 424, transmit modules 434, and baseband circuitry 422; these units may be physically separated from each other. The control processor provides command and control signals to effect functions such as, but not limited to, signal processing, timing signal generation, power control, handoff control, diversity combining, and system interfacing. In addition, the control processor assigns PN spreading codes, orthogonal code sequences, and specific transmitters and receivers for use in user communications.

Control processor 420 also controls the generation and power of pilot, synchronization, and paging channel signals and their coupling to transmit power controller 428. The pilot channel is simply a signal that is not modulated by data, and may use a constant-value or tone-type input to transmit modulator 426, effectively transmitting only the PN spreading codes applied from PN generator 432.

While control processor 420 can be coupled directly to the elements of a module, such as transmit module 424 or receive module 434, each module generally comprises a module-specific processor, such as transmit processor 430 or receive processor 421, which controls the elements of that module. Thus, in a preferred embodiment, control processor 420 is coupled to transmit processor 430 and receive processor 421, as shown in FIG. 4. In this manner a single control processor 420 can control the operations of a large number of modules and resources more efficiently. Transmit processor 430 controls generation of, and signal power for, pilot, synchronization, paging signals, and traffic channel signals, and their respective coupling to power controller 428. Receiver processor 421 controls searching, PN spreading codes for demodulation and monitoring received power.

As described above, a received power element can be used to detect the power in a signal by monitoring the energy in the outputs of digital data receivers. This power information is provided to the transmit power controller to adjust the output power to compensate for large changes in path attenuation. Thus, these elements form part of a power control feedback loop. This power information can also be provided to a receiver processor or control processor, as desired. Part of the power control function can also be incorporated within the receive processor.

For shared resource power control, a gateway receives information on received signal strength or signal-to-noise ratio from user terminals in communication signals. This information can be derived from the demodulated outputs of data receivers by receive processors; or alternatively, this information can be detected as occurring at predefined locations in the signals being monitored by the control processor, or receive processors and transferred to the control processor. The control processor uses this information to control the amount of power used for shared resource signals using transmit power controllers.

III. Power Limitations and Control

One of the key constraints in a satellite communications system is that the amount of power available on the satellite for signal transmission is severely limited. For this reason, the signal strength of each traffic signal is individually controlled to minimize the satellite power consumed while still maintaining acceptable traffic signal quality. But when controlling the signal strength of a shared resource signal such as a pilot signal, all of the users sharing the resource must be considered collectively.

For satellite repeater systems, the pilot signal is transferred within each satellite beam frequency and originates with gateways according to the satellite or satellite beam being used for communications links. However, pilot signals can also be transmitted as shared resources over various combinations of beams and sub-beams, using a variety of satellites, gateways, or base stations, as would be apparent to one skilled in the relevant art. The teachings of the present invention are not limited to a specific pilot transmission scheme in a communications system, nor by the type of shared resource being used.

Typically, each pilot signal within a communications system is generated using the same PN code with different code timing offsets. Alternatively, each pilot signal may be generated using a different PN code. This provides signals that can be readily distinguished from each other, while providing simplified acquisition and tracking. Other signals are used to transmit spread-spectrum modulated information, such as gateway identification, system timing, subscriber paging information, and various other control signals.

As previously stated, the amount of power available for signal transmission is limited in a satellite communications system by the power-generating capacity of the satellite(s). To optimize the use of this power, it must be allocated between traffic signals and pilot signals carefully. If too little power is allocated to the pilot signal, the user terminals cannot accumulate sufficient energy to synchronize their receivers with the gateway. Conversely, if too much pilot signal power is transmitted, the amount of power available for traffic signals, and thus the number of users that can be supported, is reduced. Therefore, to maximize the subscriber capacity on the satellite, the amount of pilot signal power transmitted must be accurately controlled.

One approach to solving this problem is open loop pilot signal power control. In this approach, the gateway makes an open loop estimate of the path gain in the forward link, i.e., from the modulator in the gateway, via the satellite transponder, to the user terminal. The gateway uses this estimate to control the pilot signal power transmitted by the gateway, and, thus, to control the pilot signal power transmitted by the satellite transponder. A significant problem with this approach is that this open loop estimate will contain errors due to the uncertainties of the path gain, including uncertainties in the satellite transponder electronic gain, gain compression of the satellite transponder high power amplifiers, antenna gain and path loss due to atmospheric effects such as rain attenuation. The error due to these gain uncertainties can be quite large.

IV. Signal Processing

Figure 5:
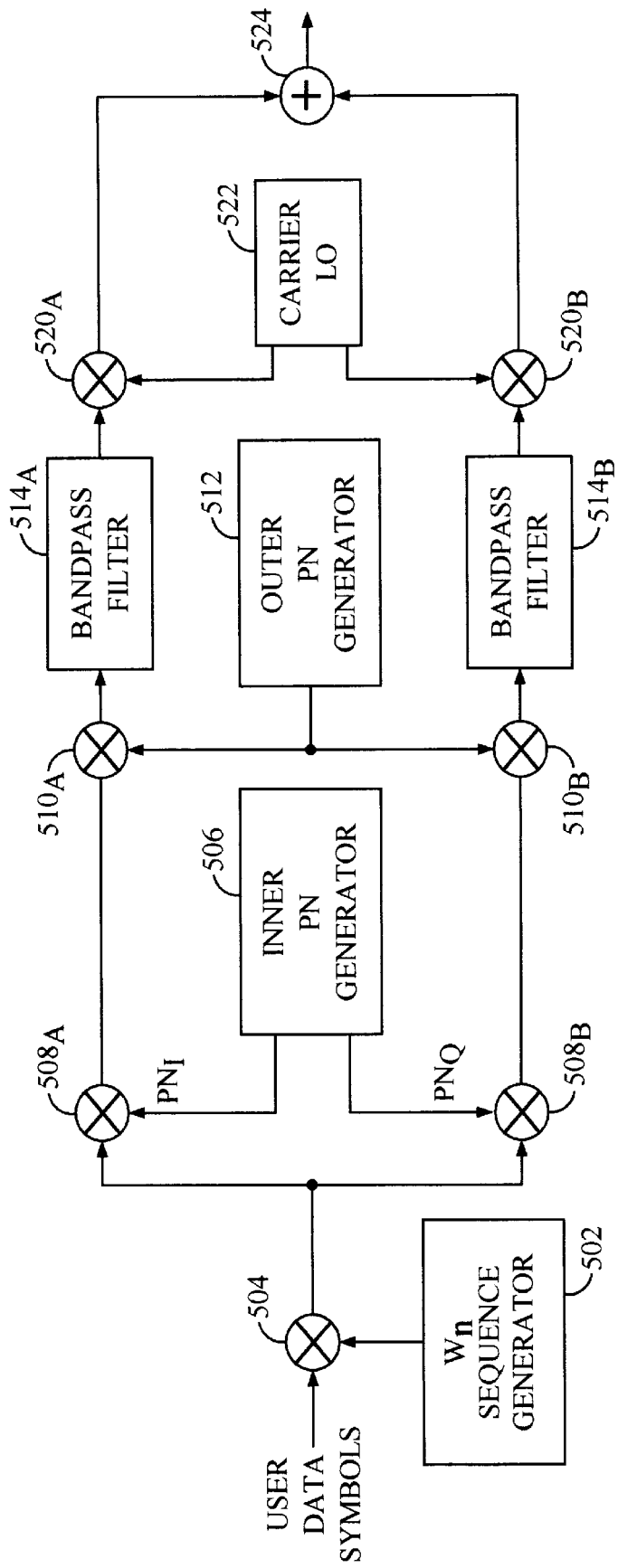
FIG. 5 illustrates a block diagram of signal coding and spreading apparatus useful in the user terminal of FIG. 4.

An exemplary signal modulator design for implementing transmit modulator 426 is illustrated in further detail in FIG. 5. Modulator 426 would include one or more encoders and interleavers (not shown) for encoding, such as by convolutionally encoding, with repetition, and interleaving data symbols in order to provide error detection and correction functions. Techniques for convolutional encoding, repetition, and interleaving are well known in the art, as are other techniques for preparing digital data for transmission. The teachings of the present invention are not limited by the method of preparing the digital data prior to spreading.

The data symbols are then orthogonally encoded or covered with an assigned orthogonal code, here a Walsh code, $W_n$, supplied by a code generator 502. Code generator 502 can be constructed using a variety of known elements configured for this purpose. The code from generator 502 is multiplied by, or otherwise combined with, the symbol data using one or more logic elements 504. The chip rate of the orthogonal code, as well as the encoded data, is determined by factors well understood by those skilled in the art.

The transmit modulator circuitry also includes one or more PN spreading sequence or code generators 506, which generates two different $PN_I$ and $PN_Q$ spreading codes for In-Phase (I) and Quadrature (Q) channels, respectively. This generator could be time shared among several transmitters using appropriate interface elements. An exemplary generation circuit for these sequences is disclosed in U.S. Pat. No. 5,228,054 entitled "Power Of Two Length Pseudo-Noise Sequence Generator With Fast Offset Adjustments," issued Jul. 13, 1993. Alternatively, the PN codes can be pre-stored in memory elements such as a ROM or RAM circuit, such as in the form of look-up tables with automatic indexing or addressing, as is known.

PN spreading code generator 506 also typically responds to at least one input signal corresponding to a beam or cell identification signal from the control processor which provides for a predetermined time delay or offset for the output of the PN spreading codes, as appropriate. Although only one PN generator is illustrated for generating spreading codes, it is readily understood that many other PN generator schemes, using more or fewer generators, may be implemented.

The orthogonally encoded symbol data is multiplied by the $PN_I$ and $PN_Q$ spreading codes using a pair of logic elements or multipliers $508_A$ and $508_B$. The same data is input to both multipliers and subjected to combination with or modulation by the individual codes. In some proposed communication systems, spreading codes are applied or used in a layered configuration. That is, a short period high rate code is used as a basic 'inner' code for spreading in a conventional manner, and a second longer period lower rate code that is synchronized with the first is used as an 'outer' code to assist in signal identification and acquisition. This multilevel spreading arrangement improves the signal acquisition process as explained in co-pending U.S. patent application Ser. No. 09/169,358 (to be assigned) entitled "Multi-Layered PN Code Spreading In A Multi-User Communications System," filed Oct. 10, 1997. The outer sequence codes are shown being applied in FIG. 5 using a pair of logic elements or multipliers $510_A$ and $510_B$, with the code being generated by code generator 512. However, the use of one or two spreading codes does not appear to have any impact on the signals in terms of changing the amount of bleeding or leakage between channels due to intermodulation distortion.

The resulting PN spread and orthogonally encoded output signals are then typically bandpass filtered or shaped by filters $514_A$ and $514_B$, and modulated onto an RF carrier, typically by bi-phase modulating a quadrature pair of sinusoids that are summed into a single communication signal, using a summation element or adder 524. This is shown by the sinusoid inputs to a pair of multipliers $520_A$ and $520_B$, which each receive one of the filtered signals from filters $514_A$ and $514_B$, respectively. However, it will be readily apparent that other types of modulation can be used within the teachings of the invention. The carrier signal source, such as a local oscillator, is represented by block 522, and uses circuits and devices well known in the art.

The above apparatus and process is also used to generate pilot signals except that there is generally no encoded or interleaved data to be processed. Instead, a constant level signal is covered with a unique code, that is a dedicated Walsh code, and then spread using logic elements $508_A$, $508_B$, $510_A$, and $510_B$. Where desired, data in the form of a repetitive pattern could also be used to formulate a pilot signal. The pilot signal is also typically provided with more power when processed by transmit power controller 428 and analog transmitter 438, to assure adequate energy for reception even on the fringes of beams, although this is not required. Once modulated onto the RF carrier (522), the pilot is transferred into each beam, or CDMA channel, serviced by the gateway, as desired.

V. Nonlinear Processes

After the above covering or channelization ($W_n$) and spreading ($PN_{inner}$, $PN_{outer}$) occurs, the resulting output is provided to a High Power Amplifier (HPA). Further amplification using a HPA occurs before the signal is transferred over the air, either directly to intended signal recipients from a base station or from a gateway through a satellite link. In addition, several user signals are, as discussed previously, summed together to form a communication signal such as for a beam or cell, and then typically scaled prior to power amplification. This process is illustrated on the left side of FIG. 6.

Figure 6:
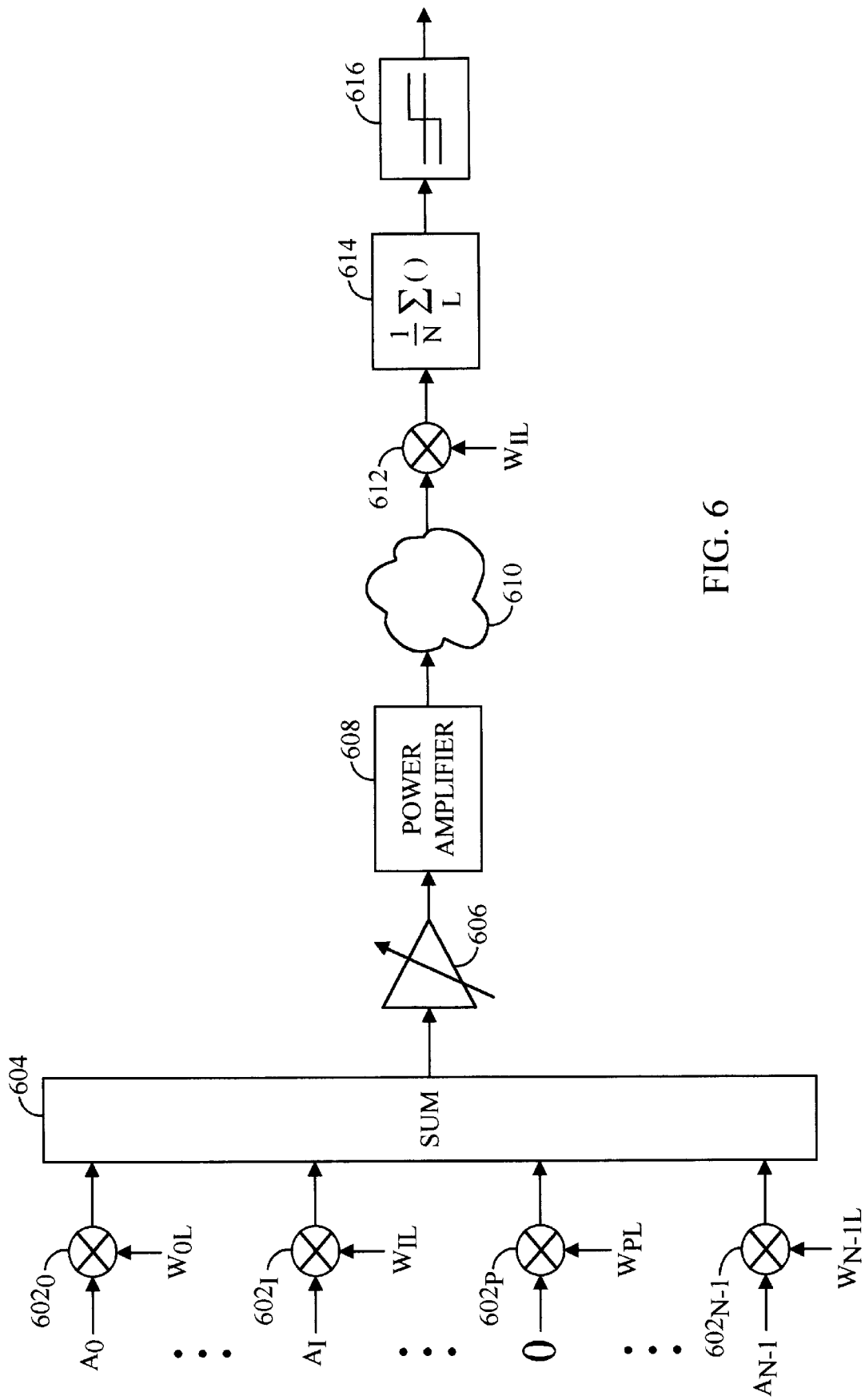
FIG. 6 illustrates a block diagram of a conventional communication signal transfer scheme.

In FIG. 6, just the Walsh coding logic is shown for channels $W_0$ through $W_n$ using coding elements $602_0$ through $602_{N-1}$, here represented as multipliers, to combine the incoming data with the appropriate Walsh function. However, other known logic or processing elements can be used for this combination as desired, as would be known. The spreading and other elements are not shown for purposes of clarity. The coded or channelized signals are summed together in a summation element or signal combiner 604 and provided to an adjustable gain or attenuation element 606, just prior to input to a high power amplifier 608, which might be found in analog transmitter 438, for example. The final amplifier stage shown by the figures could find use in gateways, base stations, or even the satellites, to provide a final increase in the power level of transmitted signals.

The power amplified signals are then transmitted to communication system 200 users or user terminals (224, 226) through a channel 610 where they are received and demodulated using apparatus such as the analog and digital receivers discussed above (316, 416). Channel 610 is typically an air interface used by gateways, base stations, and satellites for transfer of wireless signals. However, the invention is also applicable to CDMA channels carried by other means such as wires and optical cables. As is well known in the art, each user terminal applies one or more appropriate spreading codes (PN, $PN_{inner}$, $PN_{outer}$) during the demodulation process to despread the signal (not shown). The despread communication signal is then combined with an orthogonal function or code, here the desired Walsh code sequence ($W_{iL}$), used by the user terminal to retrieve signals on a particular code channel. That is, the user terminal employs a preselected or assigned code to retrieve information or data being directed to the user terminal, using known logic elements. In FIG. 6, the appropriate Walsh code is multiplied by the incoming despread data symbols using a multiplier 612. The results are accumulated in an accumulator or accumulate and sum element 614, and the energy integrated over preselected periods, in order to generate or recapture the underlying data in the received communication signal. That is, a sum of symbol amplitudes is formed in the accumulator to determine the energy in each channel. This process is known in the art and discussed in further detail for example in U.S. Pat. No. 5,577,025. The resulting accumulated values may be squared to provide absolute values. To determine when the signal has made a transition between −1 and 1 as used in communication signals a hard limiter 616 is often used.

As stated above, the presence of intermodulation distortion or nonlinear effects in the various high power amplification stages used in a communication system brings uncertainty to the adjustment, control, and predictable operation of the system or amplifiers. Without proper adjustment and control, these nonlinear elements cause the undesired transfer of energy from one traffic or user channel to another degrading system performance. Previous techniques for testing system components that relied on well known measurements such as NPR, have proven unacceptably inaccurate in predicting actual component or system performance. This results in an inability to properly configure or adjust the system and minimize the impact of intermodulation distortion. Therefore, a new technique has been developed to improve the operation of CDMA communication systems.

VI. Walsh Power Ratio

The new technique is used to test or monitor the performance of nonlinear system components under realistic or actual signal conditions to provide a more accurate prediction of component or device performance in an O-CDMA signal environment. Data signals are transferred into an input for a device or system under test, which are appropriately channelized by using a series or set of preselected orthogonal codes $W_0$ through $W_{N-1}$, and then summed together. That is, an input communication signal is generated which comprises a series of separate "traffic" channel signals, each representing information or data signals covered or channelized by an individual orthogonal code. Here, Walsh functions are used as the orthogonal codes, but this is not strictly required by the invention.

Each of the channels has some type of data or information being transferred, except for one or more preselected channels 'p', represented here by Walsh function $W_p$. The number of empty channels is determined by the degree of orthogonality to be measured. For example, as discussed further below, multiple channels may be used to provide additional information as to how orthogonality is being affected across a communication link as whole, or to provide an indication of channel-by-channel quality.

The data used in the active or 'non-empty' channels can be randomly generated in using a known process or fashion, or selected from a variety of known test signals or samples. Preferably, the active channels transferring data use the same overall input power level or gains, although not strictly required, and the data rates and general content are reasonably similar. The blank or "no data" traffic channel simply has no data input for that corresponding Walsh code or function.

The combined or multiplexed CDMA or SS signal is then scaled as desired, and transferred through the device under test and the energy measured according to or for each channel. Generally, this is done by determining what data symbols were transmitted and forming a sum of energies for each of the received symbols in a channel to determine the amount of power per channel. Ideally, one channel should show zero energy as no data was transmitted. However, due to the effects discussed above, some energy will be detected or measured in the "empty" channel.

The effect of this process is illustrated in FIGS. 7a and 7b. In FIG. 7a, a representative communication signal 702 is shown having a series of traffic channels 704 containing information to be transferred and one channel 706 having no data to be transferred. The data channels are not illustrated as all having the same power, since this not required and the technique can also be applied to systems during actual use. In this latter situation not all channels will have identical power or energy levels, for example due to various power control situations for different users, or impact of the channel on received signals. A representative received signal is shown in FIG. 7b which shows that due to the effects previously discussed, some of the energy has leaked in to the corresponding channel 706, that is orthogonality across channels has not been maintained.

A similar process in which NPR testing or analysis is employed is shown in FIGS. 8a and 8b. In FIG. 8a, a representative communication signal 802 is shown having a signal with energy or information in otherwise continuous frequency bands 804 occupied by traffic signals, except for a small channel or spectral band 806 having no data or information, thus energy, to be transferred. A representative received signal is shown in FIG. 8b which shows that due to various effects previously discussed, some of the energy has leaked in to the corresponding spectral band 806.

Using the present invention, a ratio is formed between the sum of energy detected across all "non-empty" or active channels, and the desired "empty" or inactive channel. A measurement of the ratio of the energy in the empty channel to the rest of the channels provides an idea as to what percentage of energy has shifted into the empty channel, and the approximate impact of gain on the code purity of the output. This ratio provides a measure of the degree to which orthogonality is degraded by the nonlinear response of the device or system under test. That is, a measure of the degree to which the channels are no longer isolated from each other.

To accomplish this a sum of energies is formed for the received symbols for all of the "non-empty" channels in the overall communication signal. A ratio is then formed using the detected energy in the "empty" channel, from forming a sum for each channel as discussed above, and this latter sum of energies for the "non-empty" channels. The energy in the empty channel is generally accrued over a preselected period such as several Walsh code or data symbol periods and then averaged to produce a desired energy density measurement for the channel, since there are no data symbols but just noise being measured in this situation.

The technique of the present invention can be realized using a variety of known apparatus. For example, a specialized piece of test equipment can be constructed which contains known O-CDMA type signal generation circuitry and a transmitter or transmission section for generating the desired communication signals, a mechanism for coupling signals to a non-linear device under test, and a receiver section using known circuit elements for receiving the communication signal and forming the desired sums of energies across the channels. This allows testing of a non-linear device for its performance, or the impact of nonlinear processes, in a CDMA environment. A device such as a high power amplifier can be connected in a typical fashion to other circuitry with which it would normally operate.

Figure 9:
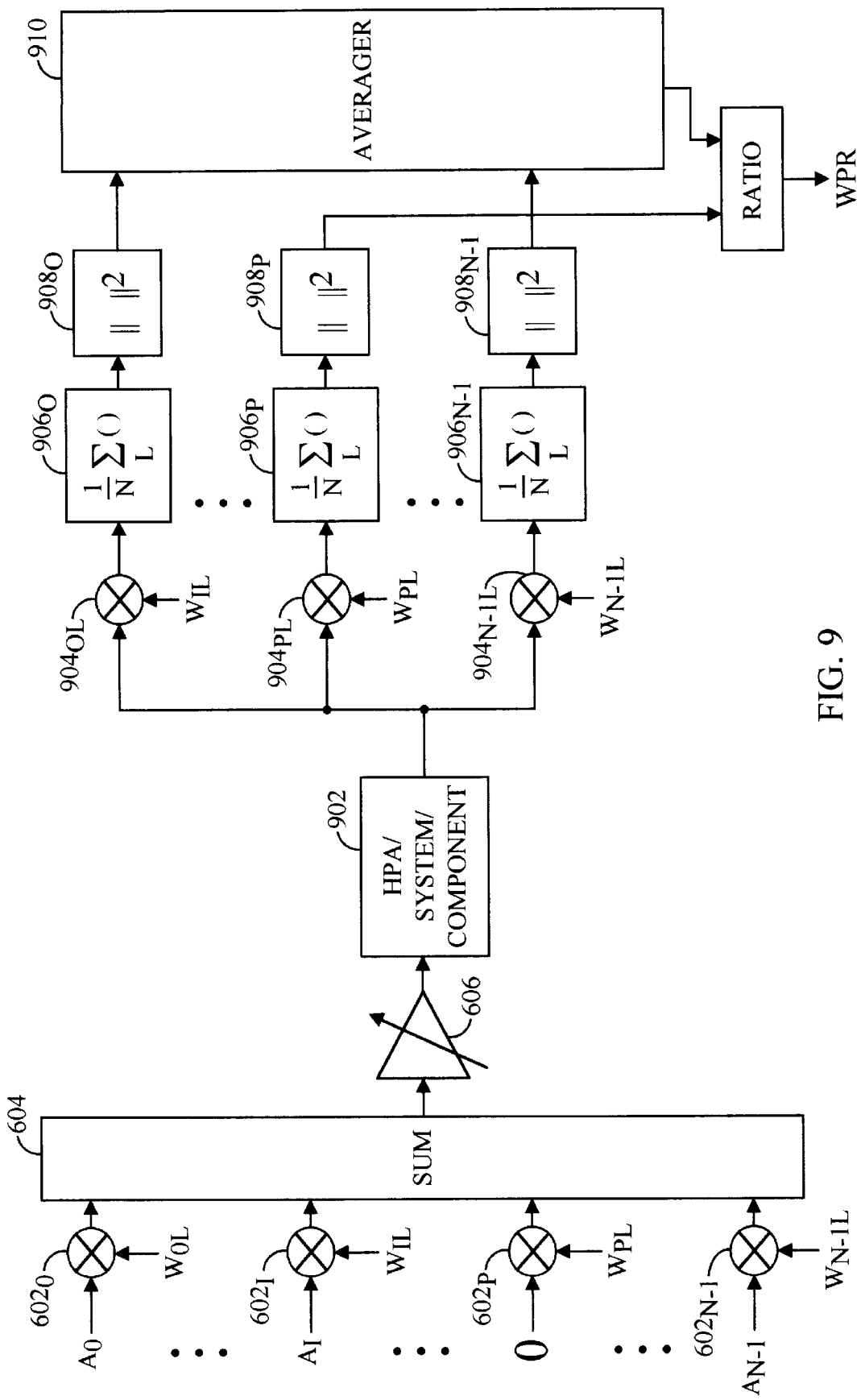
FIG. 9 illustrates a block diagram of apparatus found useful for implementing a WPR measurement scheme.

One embodiment of apparatus useful for implementing the process of the present invention is illustrated in FIG. 9. As in the case of FIG. 6, just exemplary Walsh coding logic, such apparatus being well known, is shown for data channels $W_0$ through $W_{N-1}$ using coding elements $602_0$ through $602_{N-1}$. The spreading and other elements are not shown for purposes of clarity. In FIG. 9, data signals $a_0$ though $a_{n-1}$ are transferred as inputs to logic or coding elements $602_0$ through $602_{N-1}$, here represented as multipliers with other known logic or processing elements used as desired. The data signals are combined with individual Walsh functions $W_{iL}$ (i goes from 0 to N–1), where L represents the code or sequence length, to produce covered or coded data. The coded or channelized signals are again summed together in a summation element 604 to form a (multi-channel) CDMA communication signal and provided to an adjustable gain or attenuation element 606, just prior to input to the high power device, component, or system 902 under test. The device could find use in gateways, base stations, or even the satellites.

The power amplified signals are then transferred to a series of decoding or demodulation stages over the chosen interface (air) or channel to where they are received and decoded (despreading not shown here). For this process the communication signal is combined with each orthogonal function or code, here the desired Walsh code sequence ($W_{iL}$), used by all of the active or non-empty channels, or active user terminals or code channels to transfer signals or information. That is, a set of preselected or assigned codes are applied to retrieve information or data being transferred over the communication signal, using known logic elements. 'L' represents the length of the code sequence. Preferably, codes for all of the active or used channels are employed in this operation, the code for the empty channel is also used at this point to allow retrieval or measurement of the energy content of that channel.

In FIG. 9, the appropriate Walsh codes are multiplied by the incoming despread data symbols using a series of multipliers $904_{iL}$ ($904_{0L}$–$904_{N-1L}$). The results are accumulated in accumulator or accumulate and sum elements $906_i$ ($906_0$–$906_{N-1}$) as before. A normalization factor of 1/N can be applied as shown, although this is not required for many applications. The accumulated energy or sums generated in accumulators $906_i$ ($906_0$–$906_{N-1}$), are each subjected to a squaring operation using elements or squaring means $908_i$ ($908_0$–$908_{N-1}$) to provide absolute magnitudes for energy values for the detected energy in each channel. This is most useful when working with either complex valued signals or those having negative as well as positive amplitudes (−1, 1) versus simple binary. The resulting squared signals are then used to form an average energy density value for all of the active or "non-empty" channels using an average computation element or means or averager $910$. That is, the magnitude or amount of energy received for each of the active channels is summed or added together and divided by the number of channels involved in the calculation to form an average energy value for the active channels. This average value or energy density for the non-empty channels is then transferred as one input to a ratio determination element $912$ which also receives a magnitude value for each of the empty channels being used for the test, here the single channel "p". However, the use of additional or other empty channels can provide useful information as indicated below.

The empty and non-empty energy density values or averages are then used to form the desired WPR measurement ratio. This ratio can be used as an indication of the degree to which the device under test is impacting the orthogonality or channel isolation for the communication signals in the system. This allows a system designer or tester to more accurately determine the impact particular components, devices, or systems have, and what impact any adjustments made to such devices will have. This new technique is especially useful in component testing for communication applications such as one-to-many CDMA forward link cellular, PCS, Wireless local loop (WLL), LEO satellite communication systems.

This new technique can be used in at least two modes to improve the operation of a CDMA spread spectrum communication system. In one approach, individual parts used to manufacture the system can be tested in the apparatus of FIG. 9, or using other known apparatus, to see how they will perform in the CDMA communication channel environment. Under this approach, it has been demonstrated that power control techniques used in CDMA communication systems achieve improved results by being able to more accurately take into account certain predictable or known characteristics of the system components involved in their respective measurements.

In a second approach, this technique can be used to test portions of the communication system itself either just prior to being placed in service or when operational. For example, during specified maintenance periods or periods of non-use, signals can be transferred to communication system $200$ users or user terminals ($224$, $226$) through portions of the system, such as particular base stations, gateways, or satellites to perform the measurements and characterize the current response of the system, or certain system components. A preselected CDMA test signal is injected or applied to the transmit section of a gateway with many channels 'up' or occupied with data and one or more channels 'down' or empty. A dedicated receiver then demodulates the signal and estimates the power in each channel for use in computing or measuring the Walsh Power Ratio (WPR) which is the ratio of energy density in empty channels versus the full channels. This receiver can be placed in a user terminal used solely for such testing and located at a gateway or in an area serviced by a communication system, or within one or more user terminals such as fixed terminals. In some configurations the WPR measurement can occur at one or more user terminals, not specifically dedicated to this task, in response to received commands from a gateway, using known receivers and control processors. The resulting information is communicated back to a gateway and/or returned to a central communication system location for use in further signal processing, including for various power control measurements and level adjustments.

One alternative embodiment is to provide the test communication signal (multi-channel), such as by presenting multiple channels of data or data intended for different code channels (user terminals) for transfer, through the baseband circuitry in the base station or gateway, at periodic intervals to automatically check the status of, or changes in, operating characteristics of certain components. For example, this is useful for ascertaining changes in the operating characteristics for HPAs located on satellites, which may undergo certain changes in their nonlinear characteristics over time, in response to changes in loading, or when in a powering up mode of operation, as is known. Using the present technique, measurements can be used during system use to counter deleterious effects otherwise encountered due to some of these conditions.

In another embodiment, signals containing fixed pattern data and blank or no data on certain channels, can be transferred through the system interleaved with typical data on traffic channel signals to test the system at periodic intervals, or other times as desired. This allows obtaining information on system response in real time and adjusting the operation of power amplifiers on satellites, or other devices to provide improved system operation and capacity. That is, commands can be sent to control elements which adjust certain thresholds and operating ranges for such components to provide improved control and output behavior.

As stated earlier multiple empty or non-data bearing channels can be used for the inventive process. That is, more than one channel may have no data applied in forming a multi-channel communication signal. This can serve to analyze any differences in the orthogonality or loss thereof (energy transfer) among the channels. The nonlinear effects may affect one coded channel more than others, or other processes may be occurring which creates has this impact. It is, therefore, useful to be able to assign multiple empty channels and to compare the WPR for each of the channels, as a sort of channel "goodness" indicator.

The use of a single WPR for a single channel indicates the impact on overall system performance in general while the multiple channels indicate relative channel performance or the relative impact among channels, and thus, the merit of using certain channels. However, it may also be useful to form an average WPR across such multiple empty channels the same as is done using the multiple data channels in considering the overall impact of any process on the operation of a system. This may provide additional information not as discernible from using energy on a single channel in some applications.

Where there is a limited set of M channels (with 64 being common for cellular systems and 128 for satellite systems) and N out of M of them are being used, it has been discovered that there are naturally some combinations for which one set of channels forming N is more beneficial than another. Akin to having good combinations of N and bad, in terms of measured WPR. Taking the M channels, each one can be blanked or emptied of data, one at a time, and a WPR measured very quickly for each channel. The resulting set of WPR values can be used to develop a metric to show the relative "best" channels to use for the N out of M possibilities. That is, the channels or combinations that provide the least lost of orthogonality. This can process also be accomplished taking multiple empty channels at a time, as desired, to develop a further metric of what combinations work better. This information can be used to tailor the assignment of codes or channels under given operating conditions, or for a given set of operating devices, components, or equipment.

Several other embodiments of the invention can take advantage of the multiple empty channel feature. For example, since a pattern or relative degree of maintaining orthogonality can now be measured or observed, one can recognize that one empty channel may provide better performance or communication link than another under certain operating conditions. The relative differences in WPR across multiple empty channels can be used as a measure of the relative performance of a channel. Channels or sets of channels can be periodically scanned in a communication system to look for the "best" channel before assigning new codes/channels to system users.

Therefore, the relative differences in WPR across multiple empty channels can be used as a basis for deciding what channel to employ next. That is, either intentionally for testing or as part of the natural occurrence of multiple channels being freed during use of a communication system, each of these empty channels is tested and the resulting WPR used to select a channel for assignment upon the next access request or for setting up a channel or communication link. In this manner, the WPR becomes a very effective tool for assigning channels to achieve the best communication links for system users. At the same time, this allows a more efficient use of power across the channels with this assignment.

This also allows a communication system, or the gateways and base stations, to observe changes during operation, including during the length of actual communication links or "calls". If certain channels appear to be more problematic or are more likely to have problems with orthogonality being maintained, then they are less desirable for use. This also applies to effects manifested during active calls. That is, a communication system, base station, or gateway controller can be aware that certain channels are less likely to provide high quality links, including when a channel changes. In this situation, a call or communication link can be shifted out of that channel to another during use. That is, without terminating the call. This is an advantage of the timing and coding process used in CDMA communications, that a call can more readily be shifted to another coded channel using various soft hand off techniques without breaking the connection so to speak. So, a call or link can be better managed and improved link quality maintained.

While the information available from having the WPR measurements is useful for general improvement of direct power control, other advantages can be realized. Using the WPR, such as through comparison to preselected or even dynamically adjustable thresholds, a decision can be made not only as to whether or not power should be increased or decreased, but whether or not additional channels should be assigned. That is, power can also be adjusted by simply not allowing the capacity of a particular beam or cell to increase. Therefore, channels are not assigned to new communication links or users until conditions improve.

While one solution to improve WPR is clearly to reduce power to prevent reaching into or above the saturation level for some devices or components, or to decrease the system loading by dropping users, there is generally a more important response. That is, testing can indicate an appropriate manner in which to construct and configure hardware used to transfer signals and many adjustments can be made during manufacture and testing of a communication system or its components. However, once the system is in operation, the inventive testing or monitoring approach will indicate that the system is not functioning as intended. That is, a failure of the system to accommodate the full anticipated loading (capacity) and rated power output. This is not simply a matter of simply power adjustment, but in many cases an indication that a component is not operating within any guidelines and needs to be fixed. This information can be used to decide when to send personnel to perform service or further diagnostic services on equipment in gateways and base stations, and to replace or further mechanically adjust components to improve operation. The present invention assists in such determinations.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim as our invention is:

1. A method of determining the response of a spread spectrum communication system or of one or more devices used therein to nonlinear effects, comprising the steps of:

generating a plurality of orthogonal channel signals that are each channelized using one of a set of preselected orthogonal codes, each of the channels having data being transferred, except for one or more channels preselected to be inactive;

generating a spread spectrum communication signal comprising a combination of two or more of said plurality of information signals with at least one being inactive, which are spread using one or more predetermined PN spreading codes;

transferring the spread spectrum communication signal through the system for which response is to be determined;

measuring the amount of energy present in each signal channel being used by said spread spectrum communication signal including said inactive channel; and generating a ratio of the energy in at least one inactive channel to the average energy detected across active channels, to provide a measure of the degree to which orthogonality is degraded.

2. The method of claim 1 wherein the data comprises randomly generated data.

3. The method of claim 1 wherein the data comprises preselected test data samples.

4. The method of claim 1 wherein the active channels use the same overall input power level or gain.

5. The method of claim 1 wherein one inactive channel is used.

6. The method of claim 1 wherein two or more inactive channels are used.

7. The method of claim 1 wherein the orthogonal functions are Walsh functions.

8. The method of claim 1 further comprising transferring said spread spectrum communication signal through a satellite communication system.

9. The method of claim 8 further comprising transferring said spread spectrum communication signal through a satellite communication system during periods of operation.

10. The method of claim 1 comprising transferring said spread spectrum communication signal on a preselected periodic basis through a portion of said communication system.

11. The method of claim 1 further comprising transferring data actually intended for system users interleaved with data intended to test a power ratio for channels in said spread spectrum communication signal.

12. A method of selecting one or more channels to use in a spread spectrum communication system in, comprising the steps of:
   generating a plurality of orthogonal channel signals that are each channelized using one of a set of preselected orthogonal codes, each of the channels having data being transferred, except for one or more channels preselected to be inactive;
   generating a spread spectrum communication signal comprising a combination of two or more of said plurality of information signals with at least one being inactive, which are spread using one or more predetermined PN spreading codes;
   transferring the spread spectrum communication signal through the system for which response is to be determined;
   measuring the amount of energy present in each signal channel being used by said spread spectrum communication signal including said inactive channel;
   generating a ratio of the energy in at least one inactive channel to the average energy detected across active channels, to provide a measure of the degree to which orthogonality is degraded; and
   selecting at least one channel to use based on said ratio.

13. The method of claim 12 comprising the steps of:
   generating a ratio of the energy in a plurality of inactive channels to the average energy detected across active channels; and
   selecting at least one channel to use based on said ratio.

14. The method of claim 12 further comprising the step of selecting a set of channels to use.

15. The method of claim 12 further comprising the steps of:
   generating a ratio of the energy in one or several inactive channels to the average energy detected across active channels;
   repeating the ratio generating step for each inactive channel; and
   selecting one or more channels to use based on said ratio.

16. The method of claim 12 further comprising the step of comiling one or more lists of sets of channels to use based on said ratio.

17. The method of claim 12 further comprising the step of indicating to system operators a poor status for channels being used within the communication system.

18. Apparatus for determining the response of a spread spectrum communication system or of one or more devices used therein to nonlinear effects, comprising:
   means for generating a plurality of orthogonal channel signals that are each channelized using one of a set of preselected orthogonal codes, each of the channels having data being transferred, except for one or more channels preselected to be inactive;
   means for generating a spread spectrum communication signal comprising a combination of two or more of said plurality of information signals with at least one being inactive, which are spread using one or more predetermined PN spreading codes;
   means for transferring the spread spectrum communication signal through the system for which response is to be determined;
   means for measuring the amount of energy present in each signal channel being used by said spread spectrum communication signal including said inactive channel; and
   means for generating a ratio of the energy in at least one inactive channel to the average energy detected across active channels, to provide a measure of the degree to which orthogonality is degraded.

19. The apparatus of claim 18 wherein said devices are located within a satellite communication system.

20. The apparatus of claim 18 wherein said devices comprise HPAs located on satellites.

21. The apparatus of claim 18 wherein said devices comprise HPAs located in gateways.

22. The apparatus of claim 18 wherein the data comprises preselected test data samples.

23. The apparatus of claim 18 wherein the active channels use the same overall input power level or gain.

24. Apparatus for selecting one or more channels to use in a spread spectrum communication system in, comprising the steps of:
   means for generating a plurality of orthogonal channel signals that are each channelized using one of a set of preselected orthogonal codes, each of the channels having data being transferred, except for one or more channels preselected to be inactive;
   means for generating a spread spectrum communication signal comprising a combination of two or more of said plurality of information signals with at least one being inactive, which are spread using one or more predetermined PN spreading codes;
   means for transferring the spread spectrum communication signal through the system for which response is to be determined;
   means for measuring the amount of energy present in each signal channel being used by said spread spectrum communication signal including said inactive channel;
   means for generating a ratio of the energy in at least one inactive channel to the average energy detected across active channels, to provide a measure of the degree to which orthogonality is degraded; and
   means for selecting at least one channel to use based on said ratio.

* * * * *